Patented June 17, 1952

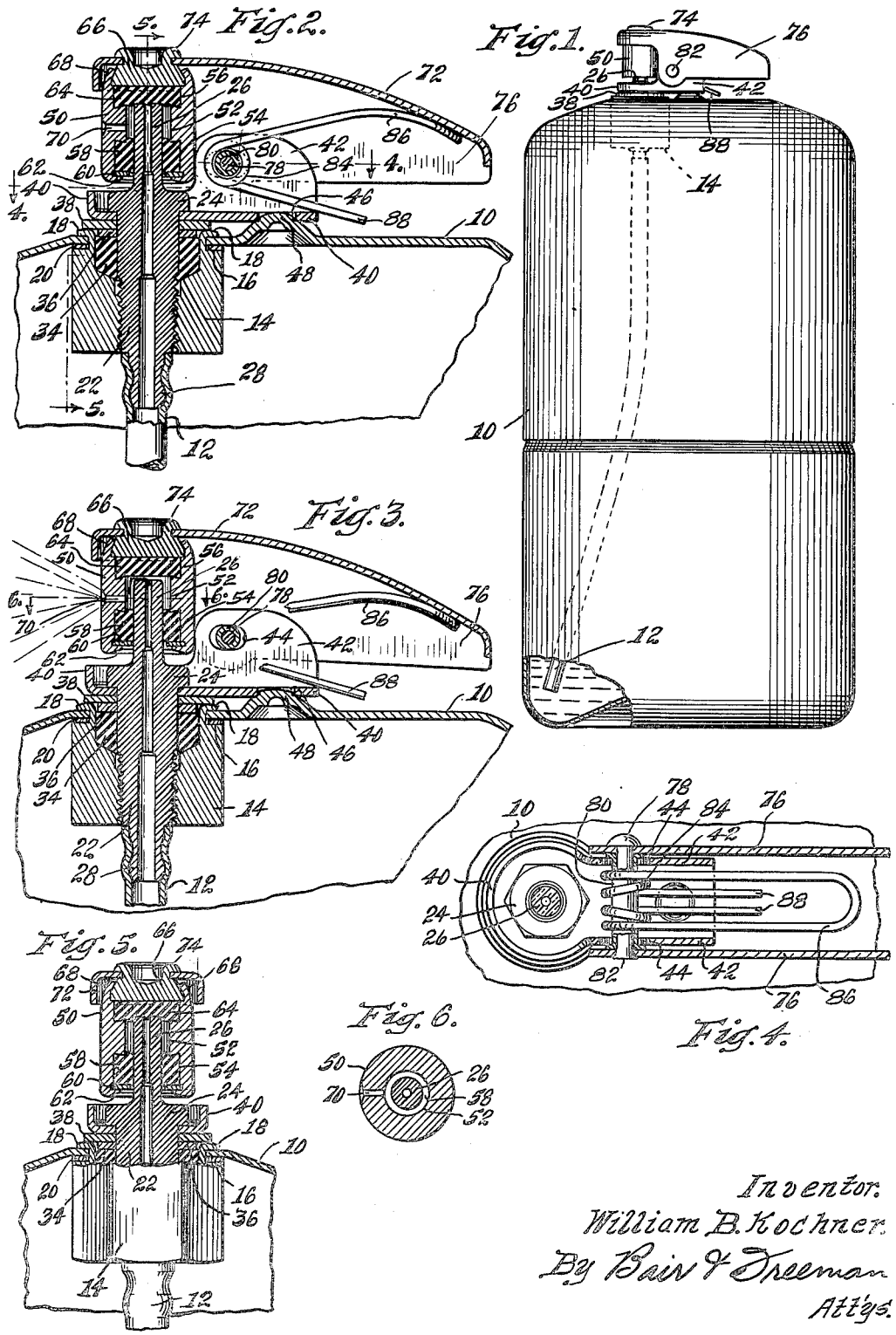

2,600,661

UNITED STATES PATENT OFFICE 2,600,661

SPRAYING VALVE STRUCTURE

William B. Kochner, St. Louis, Mo., assignor to Knapp-Monarch Company, St. Louis, Mo., a corporation of Delaware Application July 23, 1949, Serial No. 106,386

4 Claims. (Cl. 299—95)

This invention relates to a spraying valve structure, and particularly one adapted for mounting on a cannister of liquid to be dispensed under high pressure due to a charge of compressed gas contained therein to effect the dispensating operation.

One object of the invention is to provide an improved form of valve structure which is simple and inexpensive to manufacture and is so designed as to minimize the possibility of being clogged by chips of metal, synthetic rubber or the like from parts of the assembly which remain in the valve chamber after assembly.

Another object is to provide a simplified valve construction wherein a collar is brazed to the top of the cannister and the valve structure thereafter screwed into the collar, a gasket being used in a socket of the collar to prevent leakage and the arrangement being such that the gasket is entirely enclosed between the collar and a hinge bracket for the handle of the valve.

Still another object is to provide a valve stem element with a restricted passageway therein to time the dispensing operation and regulate the size of the discharge spray, a valve chamber being provided over the valve stem and normally seated against the outer end of the stem, a handle being provided for the valve chamber and pivoted to the hinge bracket and a spring being used to normally hold the valve closed.

A further object is to provide a sealing washer and a sealing disc in the valve chamber and so associated therewith and with the valve stem as to minimize the possibility of ragged edges from the washer and disc if cut from sheet material, or flashes from the edges thereof if molded, from getting into the valve chamber and clogging its discharge passageway.

Still a further object is to provide a novel hinge pin arrangement for the valve lever which permits ready replacement of a clogged valve chamber after the cannister is filled with liquid and gas without excessive wasting of the gas and consequent undesirable lowering of the pressure in the cannister.

With these and other objects in view, my invention consists in the construction, arrangement and combination of the various parts of my spraying valve structure, whereby the foregoing and other objects are attained, as hereinafter more fully set forth, pointed out in my claims and illustrated in the accompanying drawings, wherein:

Figure 1 is a side elevation of a cannister with my spraying valve mounted thereto, the drawing being approximately full size.

Figure 2 is an enlarged sectional view through the valve structure taken longitudinally of the handle and showing it in closed position.

Figure 3 is a similar sectional view showing the valve open.

Figure 4 is a horizontal sectional view on the line 4—4 of Figure 2.

Figure 5 is a vertical sectional view on the line 5—5 of Figure 2; and

Figure 6 is a horizontal sectional view on the line 6—6 of Figure 3.

On the accompanying drawing I have used the reference numeral 10 to indicate a sheet metal container adapted for containing a liquid such as insecticide or the like and a gas such as $CO_2$ under pressure for tending to expel the liquid through a flexible plastic syphon tube 12 extending upwardly from adjacent bottom of the cannister 10.

My valve structure includes a collar 14, shouldered as at 16 to enter an opening in the top of the cannister 10 and spun over at 18 to hold the collar in position. A copper washer 20 is provided against the shoulder 16 and after the parts are thus assembled the cannister and the collar are subjected to brazing heat in a brazing furnace for melting the washer 20 and thus brazing the collar to the cannister.

The collar 14 is internally screw threaded to receive a valve stem 22 which stem has a head 24 and a reduced extension 26. The stem has a nipple 28 adapted to be received in the syphon tube 12 which tube, being of flexible plastic material, snugly fits over the nipple 28 to provide a fluid-tight joint between the tube and the nipple. This arrangement eliminates the necessity of having to solder or braze a metal syphon tube into the valve stem and the flexible tube will always tend to swing to the lowest part of the cannister.

The valve stem is sealed relative to the collar 14 by a packing washer 34 of synthetic rubber or the like, this washer being backed by a pair of washers 36 and 38 and a hinge bracket 40. The hinge bracket is next to the head 24 and this head is screwed down by means of a socket wrench until the washer 38 contacts the spun-over portion 18 of the collar 14, the packing 34 being of such size as to be properly compressed at that time.

The hinge bracket 40 has a pair of ears 42 perforated by slots 44 and it also has an opening 46 to receive a projection 48 formed upwardly from the top of the cannister 10. The coaction of the opening 46 with the projection 48 prevents undesirable rotation of the hinge bracket around the valve stem without the necessity of providing an additional fastening element.

A valve sleeve 50 is provided on the stem extension 26 and it has a bore 52 provided with a pair of counter-bores 54 and 56. A sealing washer is seated in the counter-bore 54 by a retainer washer 60, the lower end of the valve sleeve 50 being spun inwardly as at 62 to retain the washer 60 in assembled position. A sealing disc 64 is seated in the upper counter-bore 56 by a plug 66, the plug being retained in position by a flange 68 on the upper end of the valve sleeve 50 spun over its edge.

The valve sleeve 50 constitutes a valve chamber, and a perforation 70 in one side of the sleeve serves as a discharge opening as will hereinafter appear. The valve sleeve is supported by a valve lever 72 formed of sheet metal and provided with an opening that receives the upper end of the plug 66 which is spun over as at 74 to retain the parts assembled. The valve lever 72 is channel-shaped in cross-section as illustrated and its depending side flanges indicated at 76 are perforated to receive a hinge pin 78. A sleeve or elongated eyelet 80 is received in the slots 44 and its forward end is flanged over as shown in Figure 4 to retain it in the ears 42. The sleeve 80 receives the pin 78 which is upset as at 82 to retain it in position.

On the sleeve 80 is a coil spring 84 having a loop 86 and ends 88 extending toward the right in Figure 2. The loop 86 engages the valve lever 72 and the ends 88 engage the hinge bracket 40 with the coils under stress for resiliently engaging the sealing disc 64 against the upper end of the reduced portion 26 of the valve stem 22 with sufficient pressure to counteract the pressure of the fluid from the cannister tending to unseat the sealing disc.

A valve structure manufactured in accordance with the foregoing specification has a number of advantages and particularly minimizes the possibility of clogged dispensers reaching the final inspection station at the factory. Heretofore capillary tubes were used as syphon tubes and the small relatively long passageways therein, while they properly metered the flow of fluid, were readily subject to clogging and were very difficult and in most instances impossible to unclog. This of course increases manufacturing cost.

With my arrangement, the syphon tube 12 can be relatively large in internal diameter and need not be soldered into the valve, which soldering also sometimes resulted in clogging because of the solder creeping into the syphon passageway when heated to soldering temperature. With my arrangement I provide a relatively short passageway in the valve stem extension 26 which is of the proper size for securing the desired metering of the flow of liquid but if it does become clogged it can usually be readily unclogged because of its shortness.

Heretofore valve structures of the general type disclosed have been used by my assignee but there have been instances of clogging due to the ragged edges of the washers 58 and 64 when cut from sheet stock getting into the valve chamber, or when these parts were molded, the flash left around the edge sometimes caused clogging. By counter-boring the passageway 52 as at 54 and 56, the outer edges of the elements 58 and 64 where ragged edges and flashes occur are confined in the counter-bores and cannot get into the chamber defined by the smaller bore 52. At the same time the counter-boring provides shoulders which adequately support the elements 58 and 64 and prevent them from undesirable movement with the stem extension 26 during operation of the valve.

The sleeve 80 for the hinge pin 78 permits temporary insertion of the pin during the assembly of the valve and after the cannister is filled with liquid and gas the lever 72 may be depressed for determining whether or not the dispenser operates properly or if it is inadvertently clogged. If clogging has occurred, the pin 78 can be withdrawn while the dispenser is held inverted and if the clogging is in the stem 26 it can be cleaned out by inserting a wire and the inspector can then hold his finger over the end of the stem 26 to prevent escape of an excessive amount of gas until the lever 72 has been replaced, or if the opening 70 is clogged, a different lever 72 may be put back on the dispenser. The pin 78 may then be reinserted in the sleeve 80 and upset as at 82 thus completing the filling and assembling operations.

Some changes may be made in the construction and arrangement of the parts of my spraying valve structure without departing from the real spirit and purpose of my invention. It is therefore my intention to cover by my claims any modified forms of structure or use of mechanical equivalents which may be reasonably included within their scope.

I claim as my invention:

1. In a spraying valve structure, a threaded collar, a stem screw-threadedly associated therewith and having a shoulder, a syphon tube on the lower end of said stem, a sleeve over the outer end of said stem having a sealing washer carried therein and surrounding the stem and a sealing disc for the end of the stem, an opening in the side of said sleeve between said sealing washer and said sealing disc for the discharge of liquid from said sleeve, a valve lever to which said sleeve is rigidly secured, a hinge bracket, said valve lever being hinged thereto, and said hinge bracket being secured in position by said shoulder of said stem when said stem is screw-threadedly associated with said collar.

2. In a valve structure of the character disclosed, a mounting collar internally screw threaded, a valve stem threaded thereinto and having an enlargement, a hinge bracket confined between said enlargement and said collar by said enlargement and thereby secured in mounted position on said collar, a sleeve over the outer end of said stem having a sealing washer carried therein and surrounding the stem and a sealing disc for the end of the stem, an opening in the side of said sleeve between said sealing washer and said sealing disc for the discharge of liquid from said sleeve, and a valve lever on which said sleeve is mounted, said valve lever being hinged to said hinge bracket.

3. In a spraying valve structure, a valve stem, a sleeve over the outer end of said stem having a sealing washer therein surrounding the stem and a sealing disc for the end of the stem, an opening in the side of said sleeve between said sealing washer and sealing disc for the discharge of liquid from said sleeve, a valve lever to which said sleeve is secured, said valve sleeve having a bore provided with counter-bores at opposite ends thereof, said sealing disc being seated in one of said counter-bores and said sealing washer being seated in the other, retainer elements therefor held in position by the ends of the sleeve being spun thereover, the retainer element for said disc being connected with said valve lever for supporting the sleeve from the lever.

4. In a spraying valve structure, a collar, a valve stem screwed thereinto, a syphon tube depending from said collar, a sleeve over the outer end of said stem having a sealing washer therein surrounding the stem and a sealing disc for the end of the stem, an opening in the side of said sleeve between said sealing washer and sealing disc for the discharge of liquid from said sleeve, a valve lever to which said sleeve is secured, a hinge bracket, said valve lever being hinged thereto, said valve sleeve having a bore provided with counter-bores at opposite ends thereof, said sealing disc being seated in one of said counter-bores and said sealing washer being seated in the other, and retainer elements therefor held in position by the ends of the sleeve being spun thereover, one of said retainer elements being a washer surrounding said stem and the other being rigidly connected with said valve lever.

WILLIAM B. KOCHNER.

REFERENCES CITED

The following references are of record in the file of this patent:

UNITED STATES PATENTS

| Number | Name | Date |
|---|---|---|
| 1,078,213 | Petnaude | Nov. 11, 1913 |
| 1,875,821 | Nazare | Sept. 6, 1932 |
| 2,099,847 | Gebauer et al. | Nov. 23, 1937 |
| 2,171,501 | Gebauer | Aug. 29, 1939 |
| 2,225,320 | Saffell | Dec. 17, 1940 |